Jan. 1, 1952
D. C. WALSH, JR
RECOVERY OF HIGH-MOLECULAR WEIGHT POLYMERS
FROM HYDROCARBON SOLUTIONS
Filed Jan. 4, 1949
2,581,155
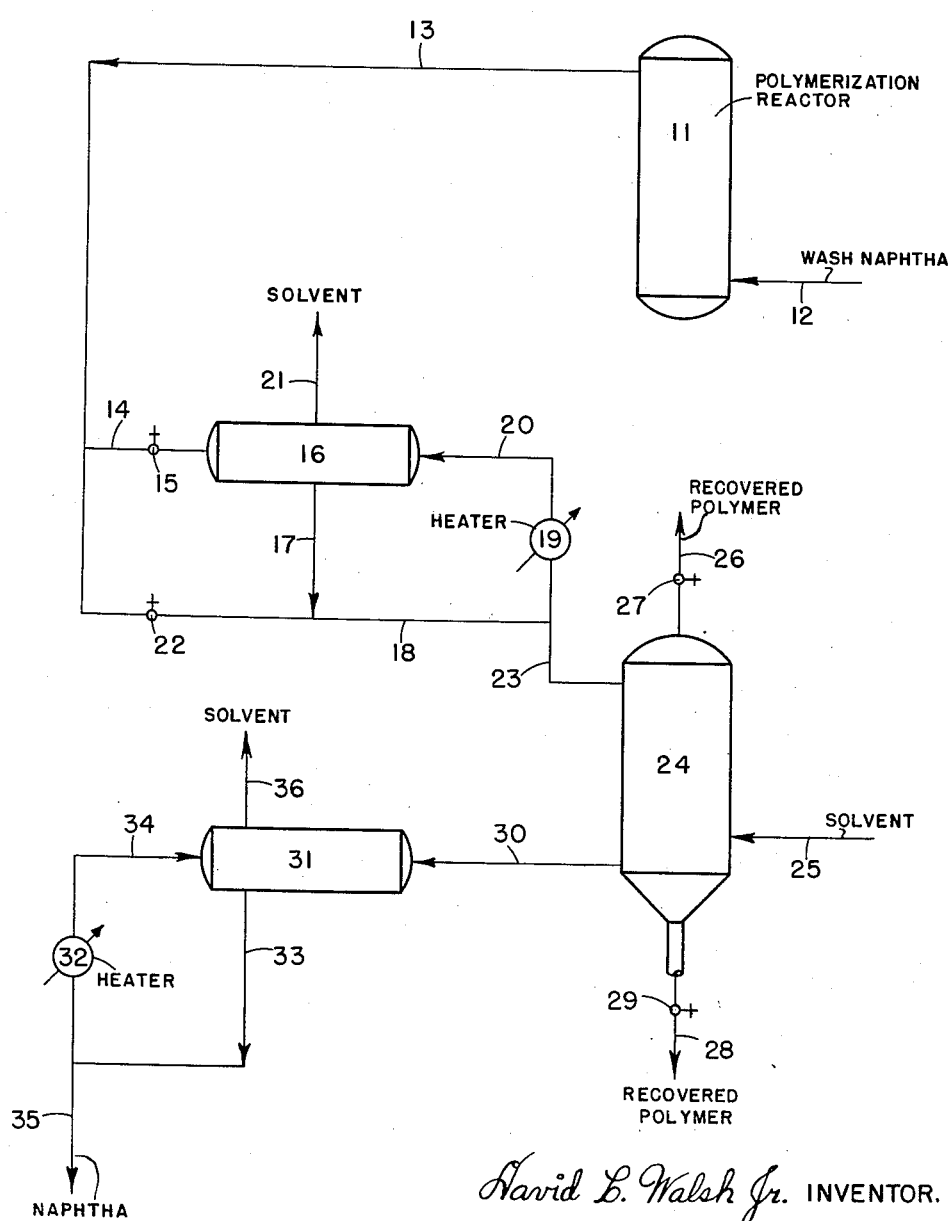
David L. Walsh Jr. INVENTOR.
BY
J. D. McKean
ATTORNEY.

Patented Jan. 1, 1952

2,581,155

UNITED STATES PATENT OFFICE 2,581,155

RECOVERY OF HIGH-MOLECULAR WEIGHT POLYMERS FROM HYDROCARBON SOLUTIONS

David C. Walsh, Jr., Baytown, Tex., assignor, by mesne assignments, to Standard Oil Development Company, Elizabeth, N. J., a corporation of Delaware Application January 4, 1949, Serial No. 69,132

3 Claims. (Cl. 260—85.3)

The present invention is concerned with the recovery of high molecular weight polymers from hydrocarbon solutions. More particularly, the invention is concerned with the recovery of high molecular weight polymers known to the industry as synthetic rubber.

In the production of synthetic rubber such as the high molecular weight polymers, a tertiary olefin, such as isobutylene, and a diolefin, such as isoprene and butadiene, are copolymerized at low temperatures in the presence of a catalytic agent of the type illustrated by aluminum chloride. It is the practice to employ the catalyst in a solution in an alkyl halide, such as methyl chloride. The reaction is conducted in vessels equipped with means for refrigerating the reaction solution and maintaining the reactants at a sufficiently low temperature to produce the desired product. After the polymerization reaction has reached a point consistent with proper quality of the polymers, it is customary to dump the solution containing the polymers into an aqueous medium, such as hot water or an alcohol solution, for separation of unreacted hydrocarbons and recovery of the polymers.

The polymer is processed in a hot water or alcohol slurry to flash off the solvent and any unreacted hydrocarbon and to serve as a carrying medium for the polymer particles for subsequent processing steps including milling operations.

When conducting the polymerization reaction in vessels equipped with refrigeration facilities, after a period of reaction the internal surfaces of the reaction vessel becomes coated with a thin film of polymer which lowers the heat transfer efficiency to a point no longer consistent with good operation and which requires shut down of the equipment for cleaning. The film of polymer on the internal surface of the reaction vessel is customarily removed by washing the vessels with a hydrocarbon solvent. The washing operation is usually conducted at a temperature of approximately 150° F. A typical hydrocarbon solvent for washing the film of polymer from the reaction vessels may have the following boiling point characteristics: I. B. P. °F. 234, F. B. P. °F. 371. Ordinarily, it is preferred that the wash oil be a highly paraffinic hydrocarbon of good solvent properties for the polymer rubber. A solvent raffinate containing only small quantities of aromatics and boiling above about 200° F. and below about 500° F. is usually satisfactory for this purpose.

After the reactors have been washed clean of polymer it has been found that the hydrocarbon will have as much as 5% by weight of polymer dissolved in it. According to usual practice, this material has been discarded to fuel which has resulted in a considerable loss in valuable rubber. In one manufacturing plant the amount of rubber lost by discarding the solution amounted to a value of $225,000.00 per year.

There have been numerous ways suggested for recovering the rubbery polymer which heretofore has been lost in the naphtha solution used to wash out the reactors. It has been proposed to precipitate the polymers from hydrocarbon solutions by employing oxygenated solvents. These methods may be disadvantageous in that the polymerization reaction, by way of which the polymer is produced, is extremely susceptible to poisons, and particularly to materials such as ethers, alcohols, ketones and the like. In the prior art process, it is natural that some of the solvents employed to precipitate the rubbery polymer may ultimately find its way into the polymerization system and deleteriously affect the polymerization reaction.

In accordance with the present invention, the high molecular weight polymers formed, for example, by reacting a tertiary olefin with a diolefin which are dissolved in the hydrocarbon solution used as a wash liquid may be recovered for reuse. The recovery process is such that the high molecular weight polymers recovered are satisfactory for inclusion in the polymer ordinarily manufactured in the process for producing the high molecular weight polymer.

It is, therefore, the main object of the present invention to provide a method for recovering high molecular weight polymers from hydrocarbon solutions.

Another object of the present invention is to provide a method for precipitating high molecular weight polymers from a hydrocarbon solution.

A still further object of the present invention is to provide a method for recovery of high molecular weight polymer from hydrocarbon solutions without introducing poisons into the systems in which it is produced.

The objects of the present invention are achieved by precipitating the polymer from its hydrocarbon solutions, employing a non-oxygenated precipitating solvent of the nature exemplified by the alkyl halides, such as methyl chloride, and the normally gaseous low molecular weight hydrocarbons such as illustrated by ethane, propane, iso and normal butanes, and the pentanes. Other alkyl halides besides methyl chloride may be employed such as ethyl chloride, methyl bromide, methylene and ethylene chloride and other chlorinated hydrocarbons such as dichlorodifluoro-methane, and the like. It is contemplated in the practice of the present invention that low molecular weight hydrocarbons such as the low molecular paraffinic hydrocarbons and the halogenated derivatives of the low molecular weight paraffins such as the chlorinated paraffins and the chlorinated and fluorinated paraffinic hydrocarbons may be employed. Preferably, the non-oxygenated solvent employed in the practice of the present invention is either methyl chloride or propane, but any of the other low molecular weight paraffins may be substituted for the preferred non-oxygenated precipitated solvents mentioned before.

Preferably then, the present invention may be described as involving the washing of a reactor in which a high molecular weight polymer, such as a polymer of isobutylene and isoprene is dissolved in a wash naphtha to obtain a solution of polymer in naphtha, following which the solution has added to it a critical amount of a liquefied solvent such as a liquefied normally gaseous light hydrocarbon or a liquefied alkyl halide such as methyl chloride in an amount sufficient to cause phase separation and recovering the polymer from one of the phases.

The high molecular weight polymer which is recovered in the practice of the present invention from hydrocarbon solutions containing it may be a polymer of isobutylene and isoprene which is formed by contacting the aforesaid hydrocarbon at a low temperature, approximately −140° F., with a Friedel-Crafts catalyst. The polymer may be formed by reacting other tertiary olefins and other diolefins in a similar manner, for example, besides isobutylene which is a preferred reactant may be mentioned the isoamylenes, isohexylenes, isoheptalenes and iso-octylenes, as well as isononalenes. As examples of other diolefins besides isoprene may be mentioned butadiene 1-3, pentadiene 1-3, heptadiene 1-3, hexadiene 1-3, and other conjugated diolefins of the family mentioned.

There are a number of critical factors involved in the practice of the present invention. For example, it is necessary that the wash naphtha in which the polymer is dissolved have added to it an amount of a dispersing or antitack agent such as zinc stearate, aluminum stearate, and similar other antitack agents, sufficient to prevent the polymer from adhering to the walls of the chambers in which the solution is treated. As examples of other antitack agents which may be employed in the practice of the present invention may be mentioned the insoluble metal salts of the various fatty acids such as those obtained from cocoanut and palm oil and exemplified by lauric, myristic, palmitic and stearic acids, although other of the fatty acids of the same series may be employed. The antitack agents may be employed as a zinc or aluminum salts of the foregoing acids or as the metal salts such as calcium, cadmium, and other salts of such acids. Good results may be also obtained with finely divided carbon black or calcium carbonate, or one of the various forms of talc. An amount of zinc stearate, for example, in the range from about 2 to 5% by weight of the solution is necessary to prevent adherence of the polymer to the walls of the containers.

Another critical requirement, in the practice of the present invention, is the maintenance of the proper ratio of solvent to the polymer solution. When a solvent such as methyl chloride is employed, 3 to 4 parts of methyl chloride should be admixed with every part of the naphtha polymer solution, whereas when propane, for example, is employed as the solvent from 1 to 5 parts of propane are required for every part of the polymer naphtha solution.

When employing the process of the present invention, the polymer will either float on the surface of the solution or will fall to the bottom of the vessel in which it is treated. If the solvent is a halogenated paraffin such as an alkyl halide, for example, methyl chloride, the polymer will rise to the surface of the solution. If a liquefied normally gaseous paraffinic hydrocarbon, such as propane, is employed as the solvent the polymer will settle to the bottom of the vessel in which it is contained.

The invention will be further illustrated by reference to the drawing in which the sole figure presents a preferred mode of practicing the invention.

Referring now to the drawing, numeral 11 designates a reactor vessel in which a high molecular weight polymer has been produced by polymerizing isobutylene with isoprene at a temperature in the neighborhood of −140° F. employing aluminum chloride as a catalyst. For purposes of illustration, it will be assumed that the reaction in vessel 11 has been terminated and it is desired to clean the vessel. Under these circumstances the contents of the vessel have been flushed out and the temperature of the vessel allowed to rise. A wash naphtha of the type illustrated at a temperature of about 150° F. is then caused to flow through the reactor vessel 11 from line 12 which leads from a source of wash naphtha not shown. The relatively warm naphtha effectively dissolves out the particles of polymer adhering to the inner walls of reactor 11 and flows as a solution from the reactor 11 by way of line 13. Since the polymer adhering to the walls of reactor 11 may have occluded in it an appreciable quantity of methyl chloride, it may be desirable when methyl chloride or an equivalent alkyl halide is not employed as a solvent to provide recovery facilities for the methyl chloride. Under these circumstances, it will be desirable to route the solution in line 13 by way of branch line 14 controlled by valve 15 to a drum 16 from which the methyl chloride may be recovered by circulating a portion of the solution through line 17, line 18, heater 19, and line 20 back into the drum 16, from whence the methyl chloride may be recovered by line 21 and routed to a storage system not shown. In heater 19 the temperature of the solution may be raised to a temperature in the neighborhood of 150° F. allowing the methyl chloride to be recovered by distillation as described. However, under usual circumstances, it may be desirable to employ methyl chloride as the solvent for recovering the polymer from the hydrocarbon solution and it will not be necessary to use drum 16 for recovery of methyl chloride. Under these latter circumstances, valve 15 will be closed and valve 22 in line 18 will be open, allowing the hydrocarbon solution of polymer to be sent directly by way of lines 13, 18, and 23 to treating vessel 24 into which a liquefied solvent, for example methyl chloride, may be introduced by line 25. Conditions are adjusted in vessel 24 to allow separation of the polymer from the hydrocarbon stock. Ordinarily, the conditions for separation of the polymer will require adjustment of the temperature of the hydrocarbon solution from which the polymer is to be separated. The temperature employed in the vessel 24 should be sufficient to maintain the solvent in liquid condition. Pressures should be sufficient to maintain a liquid phase. When propane is employed as the solvent, a temperature in the range from about −10° to about −60° F. will be desirable, depending on the pressure imposed on the system. At atmospheric pressure when propane is employed, a temperature of −40° F. will suffice.

When methyl chloride is employed as the liquid solvent, a temperature in the range from about 0° to about −20° F. may be found satisfactory. At atmospheric pressure when employing methyl chloride, a temperature of about −15° F. may be used to give satisfactory results.

As mentioned before, methyl chloride in a liquid condition is introduced by line 35. Separation occurs in vessel 24 to allow separation of the polymer as an upper phase which may be withdrawn by line 26 controlled by valve 27. It is understood, of course, that line 26 may suitably be a conveyor or other discharging means for recovering the separated polymer from vessel 24.

When propane or other liquefied normally gaseous hydrocarbon is employed as the solvent, the polymer will drop to the bottom of vessel 24 and may be discharged therefrom by line 28 controlled by valve 29. As with line 26, line 28 may be a conveyor system for discharging the separated polymer.

The naphtha and the solvent from which the polymer has been separated in vessel 24 discharges therefrom by way of line 30 into a recovery vessel 31 for the solvent which is provided with a heater 32 from which the solvent and naphtha may be circulated through lines 33 and 34 back to the vessel 31 to raise its temperature and allow separation of the solvent from the naphtha by distillation. The naphtha substantially free of solvent may be discharged from the system by way of line 35 for further use in washing the reactor 11 while the solvent may be recovered from vessel 31 by line 36.

The polymer plus residual solvent removed from vessel 24 by either lines 26 or 28 may be transferred to other chambers where it may be washed again with solvent to remove the last traces of naphtha. It may also be subjected to heating and kneading operations to remove substantially all of the solvent. The system may also include suitable milling and other accessory rubber processing operations for treating the recovered product.

The present invention will now be illustrated further by reference to the following example in which a solution of polymer formed by reacting isobutylene with isoprene at a temperature of −140° F. in the presence of aluminum chloride was washed from the walls of a reactor in which it was produced and diluted with 3 parts of liquefied methyl chloride. The temperature of the solution was then adjusted to −15° F. Separation began to occur when the polymer solution of naphtha had been diluted with 3 parts of methyl chloride. Optimum separation appeared to occur with a dilution ratio of 4 parts of methyl chloride to 1 part of naphtha solution.

In another run, a similar wash naphtha, obtained from washing a polymerization reactor used in a polymerization operation of the type illustrated, was diluted with propane to obtain a dilution ratio of 5 parts of propane to 1 part of hydrocarbon solution. A separation of the polymer from the solution of wash hydrocarbon and propane was obtained.

In both of the foregoing runs, it was necessary to add zinc stearate to the wash naphtha solution before separating polymer therefrom to prevent the polymer from adhering to the walls of the container in which the separation was effected.

Runs were made in which the same solution of polymer and wash hydrocarbons were diluted with propane to obtain mixtures having a dilution ratio of 1 part of propane to 1 part of naphtha solution and 3 parts of propane to 1 part of naphtha solution. Under these conditions the propane-naphtha solution was maintained at atmospheric temperatures and under pressure to allow the propane to remain in solution. The polymer was separated from the solution of naphtha and propane and submitted for examination. This polymer appeared to be of much poorer quality than the polymer obtained from the low temperature runs in which the temperature was adjusted to maintain the methyl chloride and propane in solution under substantially atmospheric pressure.

It will be seen from the foregoing examples that the present invention, besides allowing the recovery of polymer from naphtha employed to wash the reactors free of adhering polymer, may be used to fractionate polymer fractions. For example, in the polymerization of isobutylene with isoprene to obtain a high molecular weight polymer, a polymer may be produced having a molecular weight of anywhere from 100,000 to 250,000. These polymers are mixtures of polymers of higher and lower molecular weights, the aggregate molecular weight being the cited figure. It is known that some of these polymers have better and poorer qualities than other of the polymers. Therefore, in accordance with the present invention, it may be desirable to dissolve the polymers in a naphtha solution and then to fractionate selectively polymers of different molecular weight from the solution by adjusting the temperature at which the polymer is separated. Thus at a low temperature of approximately −40° F. and an atmospheric pressure employing propane as the solvent, a polymer having a molecular weight in the upper limits of the range of molecular weight given may be separated while at higher temperatures of the order of 0° F. or about 75° F. polymers having molecular weights in the lower portion of the range of molecular weight may be obtained.

It will thus be seen that the invention has broader application than just to the recovery of polymer from wash naphtha resulting from the washing of polymerization reactors with naphtha to remove adhering polymer.

The hydrocarbon wash solvent employed in the practice of the present invention, as mentioned before, may be a highly paraffinic hydrocarbon such as one boiling in the range from about 200° to 500° F. It is to be understood that while a solvent boiling in this range may be satisfactory, the availability of substantially pure normal paraffinic hydrocarbons will allow the use of such paraffinic solvents in the practice of the present invention. Thus, it is possible to use hydrocarbons having lower boiling ranges than those given before. For example, it may be desirable to employ a substantially pure paraffinic hydrocarbon such as normal hexane, heptane, iso-octane and other members of this same homologous series having a boiling point sufficiently great to act at a solvent in the practice of the present invention. It may be stated as a general rule that the normal paraffinic hydrocarbon solvent may be a substantially pure hydrocarbon but preferably should boil in the range between 200° and 500° F. Paraffinic hydrocarbon fractions boiling between 140° F. and 500° F. may also be employed. When employing the lower boiling hydrocarbon solvents to dissolve the polymer, such as normal hexane, it will be desirable to employ a precipitating solvent having a substantially different boiling point. Thus, for example, if hexane is employed as the solvent for the polymer, the precipitating solvent should, to insure good results, preferably be one of the low boiling solvents illustrated, such as propane, methyl chloride, and the like.

While in the specific examples where propane and methyl chloride were employed as a solvent, temperatures in the range from about −60° to about 0° F. were employed, it will be apparent to the skilled workman that the present invention should not be limited to these specific temperatures and that the temperature will vary with the non-oxygenated precipitating solvent employed to recover the polymer from its solution in the paraffinic hydrocarbon. Ordinarily, temperatures within the range stated will give good results, but it will be understod that these temperatures may vary widely and that lower temperatures under some conditions may be desirable such as, for example, a temperature as low as −150° F. when liquefied ethane is employed. On the other hand, the temperatures should not exceed 0° F. since excessive pressures would be required to maintain the non-oxygenated precipitating solvent in a liquefied condition and the polymer recovered may be of unsatisfactory quality.

This application is a continuation-in-part of my abandoned application, Serial No. 775,716, filed September 23, 1947, and entitled "Recovery of High Molecular Weight Polymers."

The nature and objects of the present invention having been fully described and illustrated, what I wish to claim as new and useful and to secure by Letters Patent is:

1. A method for recovering a solid high molecular weight aluminum chloride catalyzed rubbery copolymer of isobutylene and isoprene from a warm solution of it in a hydrocarbon fraction boiling in the range from about 140° to about 500° F. which comprises adding to the solution a zinc stearate anti-tack agent having the property of preventing said polymer from adhering to surfaces in contact therewith in an amount in the range from 2% to 5% by weight of the hydrocarbon solution, admixing the solution containing the anti-tack agent with a liquefied low molecular weight non-oxygenated precipitating solvent selected from the class consisting of propane and methyl chloride in an amount in the range from 1 to 5 parts by volume of solvent to every part of hydrocarbon solution, lowering the temperature of the admixture to a temperature in the range between −60° and 0° F. to cause a separation into a polymer phase and a hydrocarbon phase and separately recovering said phases.

2. A method for recovering a solid high molecular weight aluminum chloride catalyzed rubbery copolymer of isobutylene and isoprene from a solution of it in a hydrocarbon fraction boiling in the range from about 200° to 500° F. at a temperature of about 150° F. which comprises adding to the solution an amount of a zinc stearate anti-tack agent having the property of preventing said polymer from adhering to surfaces in contact therewith in an amount in the range from 2% to 5% by weight based on the total hydrocarbon solution, admixing the solution containing the anti-tack agent with a liquefied low molecular weight non-oxygenated precipitating solvent selected from the class consisting of propane and methyl chloride in an amount in the range from 1 to 5 parts of non-oxygenated solvent to every part of solution, lowering the temperature of the admixture to a temperature in the range from −60° to 0° F. to cause a separation of said admixture into a polymer phase and a hydrocarbon phase and separately recovering said phases.

3. A method for fractionating a solid high molecular weight aluminum chloride catalyzed rubbery copolymer of isobutylene and isoprene which includes the steps of forming a solution of said high molecular weight polymer in a hydrocarbon boiling in the range from 200° to 500° F. at a temperature of about 150° F., adding to the solution an amount of a zinc stearate anti-tack agent in the range from 2 to 5% by weight of said solution, admixing the solution containing the anti-tack agent with a liquefied low molecular weight non-oxygenated solvent selected from the class consisting of propane and methyl chloride in an amount in the range from 1 to 5 parts by volume based on the solution to cause a separation into a polymer phase and a hydrocarbon phase on adjustment of temperatures thereof, lowering the temperature of the solution to a temperature in the range between −60° and 0° F. to cause a separation into a first hydrocarbon phase and a first polymer phase, separately recovering said phases, raising the temperature of the first hydrocarbon phase within the range given to cause the formation of a second hydrocarbon phase and a second polymer phase, separately recovering said phases, raising the temperature of said second hydrocarbon phase within the range given to cause a separation into a third hydrocarbon phase and a third polymer phase, and separately recovering said phases.

DAVID C. WALSH, JR.

REFERENCES CITED

The following references are of record in the file of this patent:

UNITED STATES PATENTS

| Number | Name | Date |
|---|---|---|
| 2,255,388 | Kunc | Sept. 9, 1941 |
| 2,401,754 | Green | June 11, 1946 |
| 2,408,007 | Thomas | Sept. 24, 1946 |
| 2,451,047 | Skooglund | Oct. 12, 1948 |

OTHER REFERENCES

Graff et al., Ind. Eng. Chem., 32, 294–298 (March 1940).